May 30, 1939. A. L. GRAMMER 2,160,728

BOOKMAKING APPARATUS

Filed Oct. 6, 1937 4 Sheets-Sheet 1

WITNESS:

INVENTOR
Allen L. Grammer
BY
Augustus B. Stoughton
ATTORNEY.

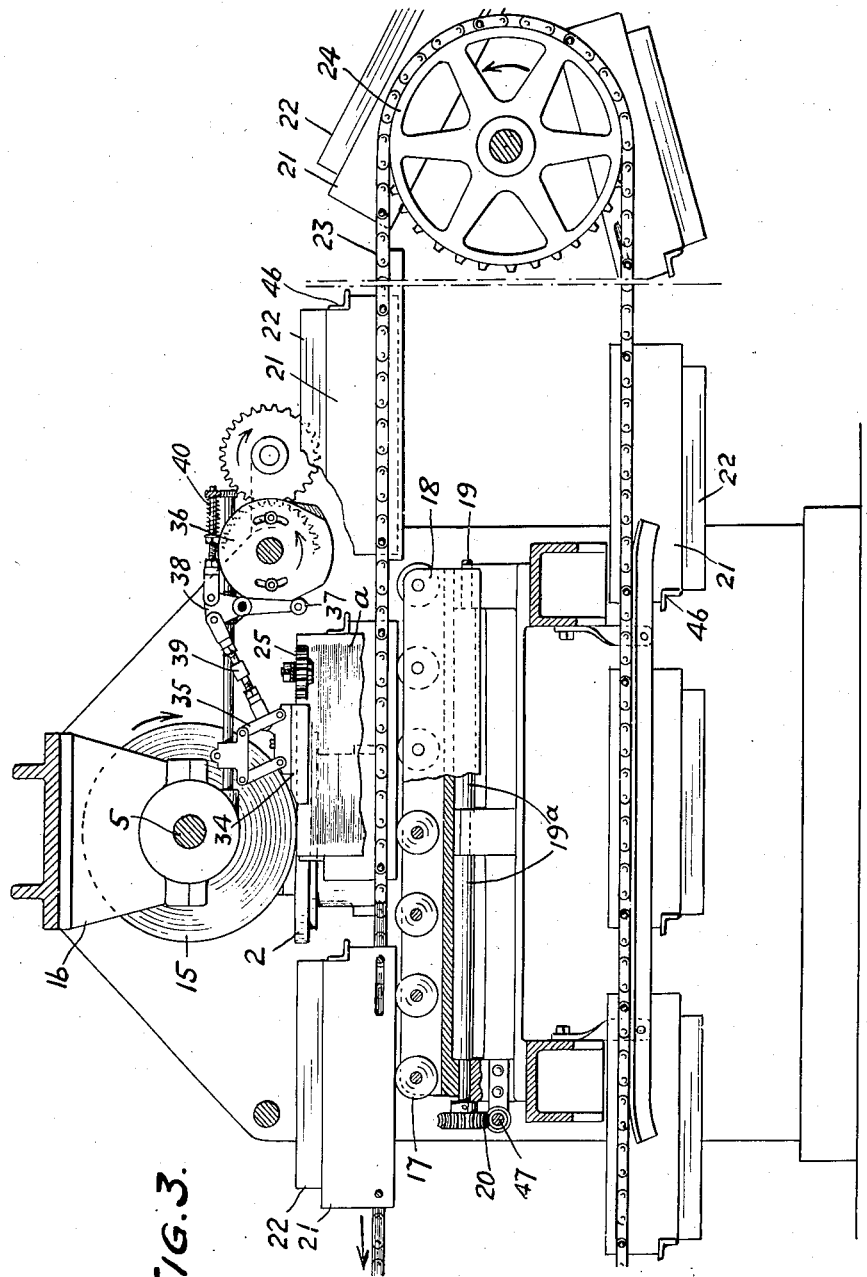

May 30, 1939.　　　A. L. GRAMMER　　　2,160,728
BOOKMAKING APPARATUS
Filed Oct. 6, 1937　　　4 Sheets-Sheet 3
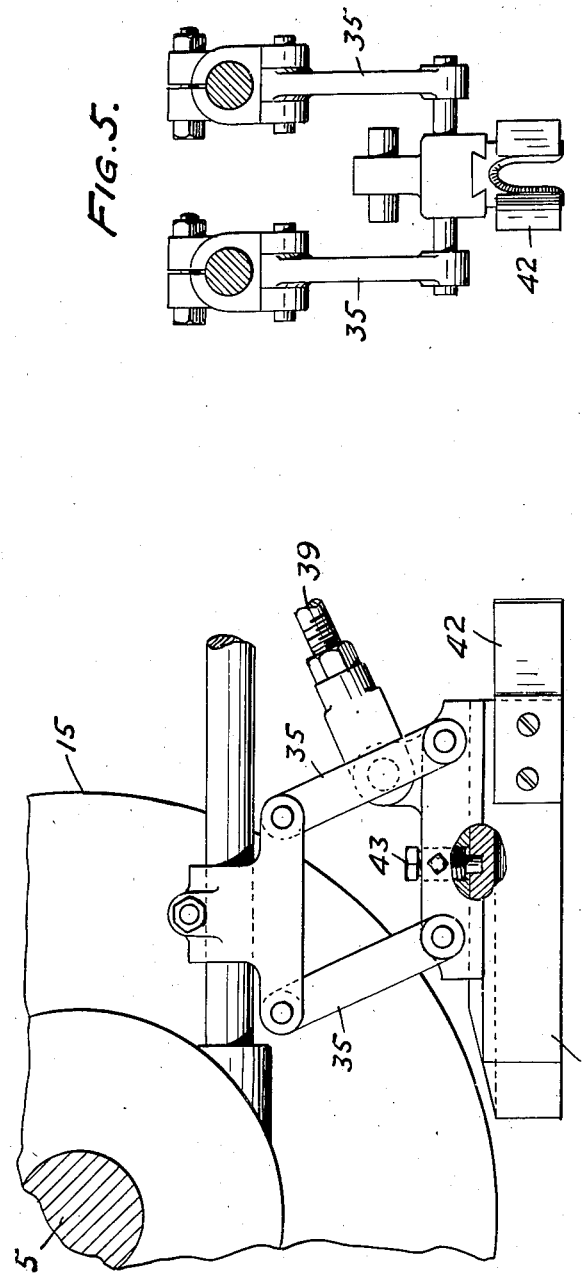
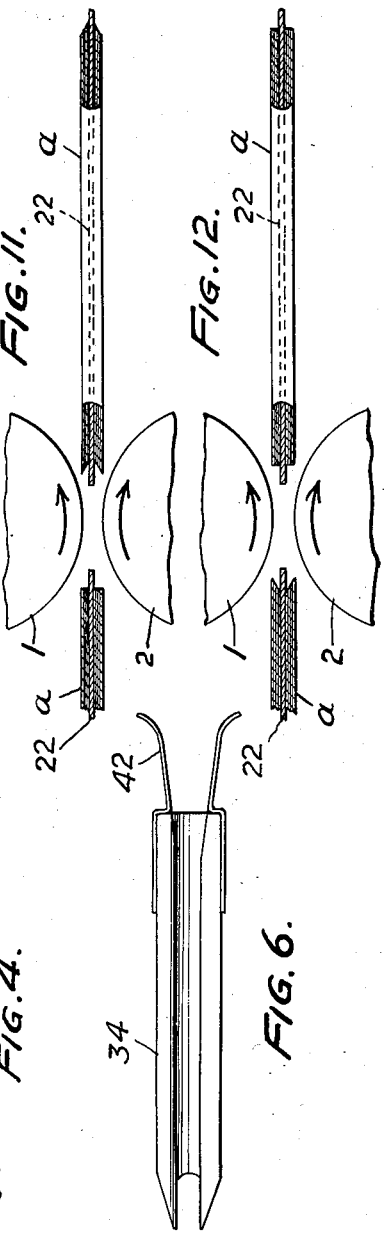
INVENTOR
Allen L. Grammer
BY Augustus B. Stoughton
ATTORNEY
WITNESS:

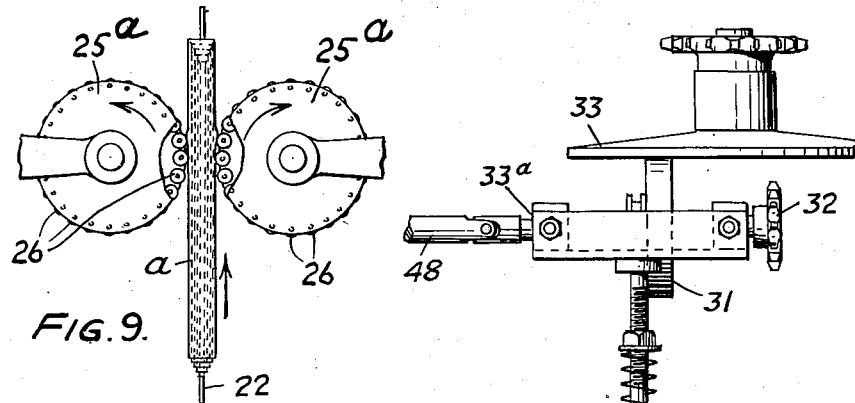
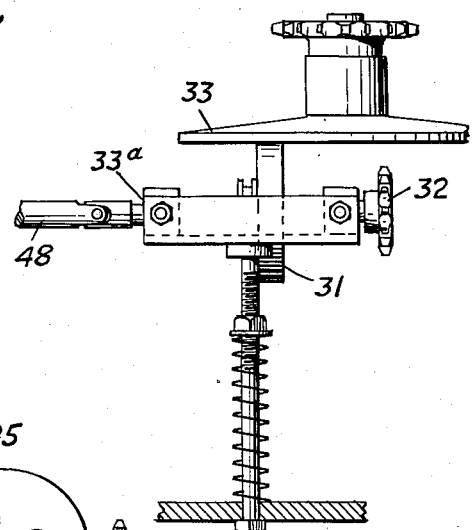
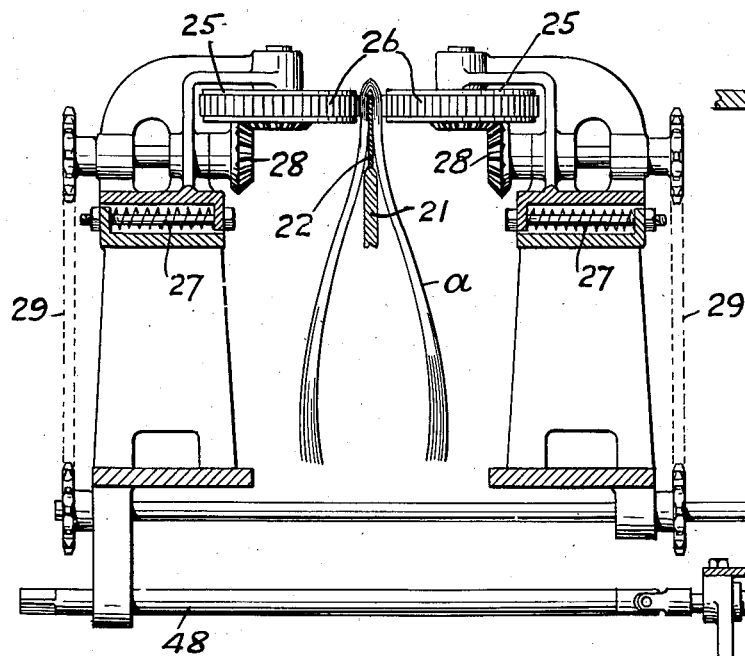
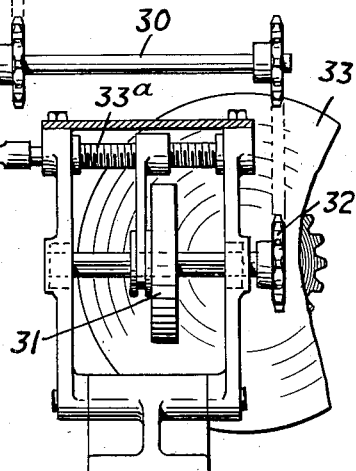
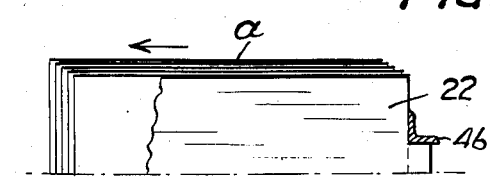

Patented May 30, 1939

2,160,728

UNITED STATES PATENT OFFICE 2,160,728

BOOKMAKING APPARATUS

Allen L. Grammer, Meadowbrook, Pa., assignor to The Curtis Publishing Company, Philadelphia, Pa., a corporation of Pennsylvania Application October 6, 1937, Serial No. 167,507

7 Claims. (Cl. 11—1)

One object of the present invention is to provide a machine for moulding or shaping an assemblage consisting of nested folded leaves having a peaked back, in such a way that the back is made flat and the leaves are properly positioned ready for stitching or stapling. Another object of the invention is to provide for adapting the machine to assemblages of leaves of different numbers, or in other words, to books containing different numbers of pages or leaves. Another object of the invention is to provide means whereby the ends of the leaves will be arranged in the same plane although the operation of some parts of the machine tend to comb them into another position.

Other objects of the invention will appear from the following description at the end of which the invention will be claimed.

Generally stated the invention consists in a pair of positively driven spring pressed squeeze rolls arranged with their end faces substantially in the same plane, with space between their peripheries, a positively driven presser roll mounted for rotation about a fixed axis and having its periphery in confronting relation to said space, a series of carrying wheels arranged in a horizontal row and spaced from the periphery of the presser roll, a series of carriages adapted to travel on the carrying rolls and each having a blade adapted to enter the space between the squeeze rolls and to clear the periphery of the presser roll, a spring pressed guide shoe mounted for oscillation parallel to itself and arranged in the path of the oncoming blades and adapted to feed an assembly of sheets constituting a book carried on a blade into the bite of the squeeze and presser rolls, with or without combing mechanism for correcting the relative position of the leaves or sheets.

The invention also consists in the improvements to be presently described and finally claimed.

In the following description reference will be made to the accompanying drawings forming part hereof and in which, Figure 1 is a perspective view of a part of the machine looking in the direction indicated by the arrow.

Fig. 3 is a side view partly in section.

Fig. 4 is an elevational view drawn to an enlarged scale and illustrating the guide shoe shown in the other figures.

Fig. 5 is a transverse sectional view of a part of the mechanism shown in Fig. 4.

Fig. 6 is a plan view of the under side of the guide shoe.

Fig. 7 is a diagrammatic view principally in central section and indicating fanning at the front and rear of the assemblage of sheets.

Fig. 8 is a transverse sectional view illustrating means for correcting or combing the fanning effect illustrated in Fig. 1.

Fig. 9 is a top or plan view of a portion of the mechanism shown in Fig. 8.

Fig. 10 is a plan view illustrating the driving mechanism shown at the right in Fig. 8.

Fig. 11 is a diagrammatic view which is in general a plan and which illustrates the action of the rolls in tending to make the inside sheets lead the outside sheets; and Fig. 12 is a similar view showing that by combing the outside sheets into positions leading the inside sheets, prior to the passage between the rolls, the sheets are in correct alignment after leaving the rolls.

Figure 1:
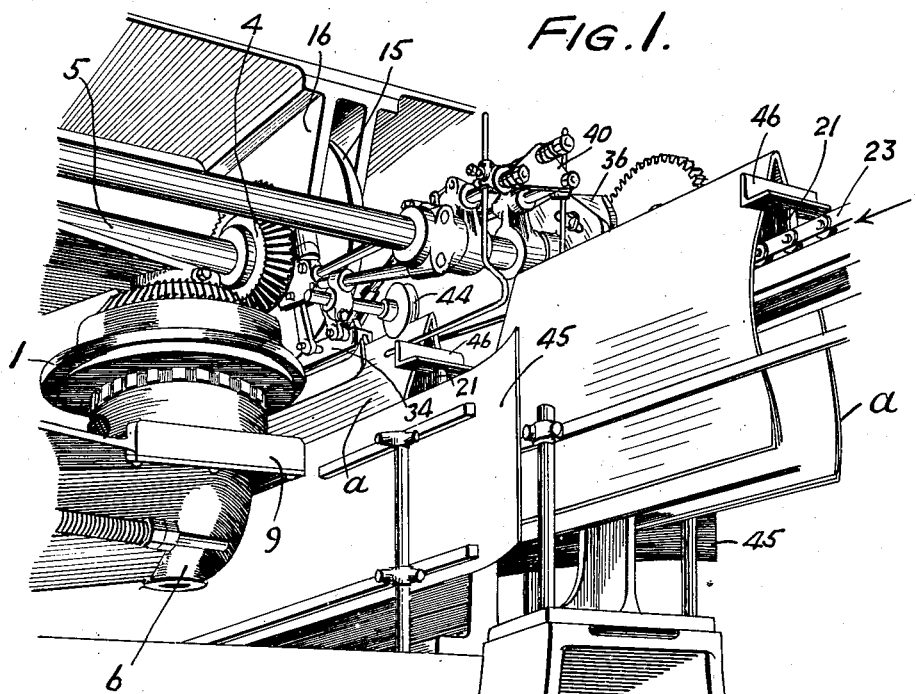
Figure 2:
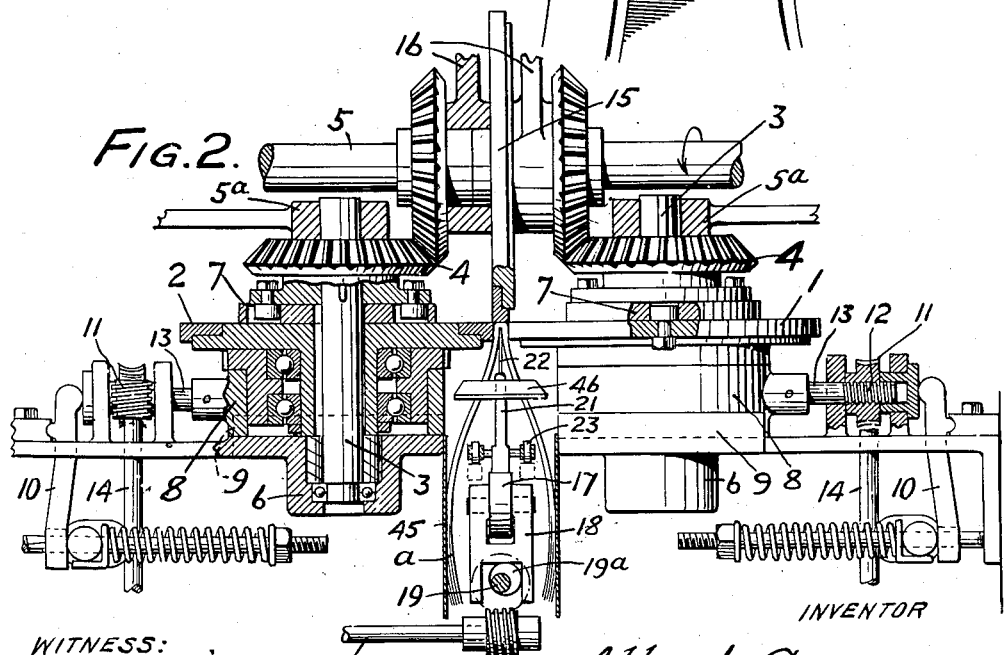
Fig. 2 is a transverse sectional view showing parts in elevation.

Referring more particularly to Fig. 2, 1 and 2 indicate a pair of positively driven spring pressed squeeze rolls arranged with their end faces substantially in the same plane with space between their peripheries. These squeeze rolls are substantially alike and a description of one of them will suffice. 3 are shafts each driven by means of gearing 4 from a driven shaft 5. These shafts 3 are shown in vertical position and they are journaled at their ends in fixed bearings 5ª and 6. Each squeeze roll is connected with a shaft 3 by means of an Oldham or like coupling 7. This allows the squeeze rolls 1 and 2 to be adjusted toward and away from each other to accommodate books of different thicknesses. The hubs of the squeeze rolls are journaled in slides 8, ball bearings are shown for the purpose. The slides 8 move between guides 9; and spring pressed levers 10 serve to press the slides towards each other and this presses the squeeze rolls towards each other and up to their work. A worm and worm wheel 11, including a threaded portion 12 shown at the right of Fig. 2, operates as a nut for varying the effective length of the shaft 13 so that the necessary adjustment of the rims of the squeeze rolls toward and away from each other can be made by turning the stem 14 of the worms 11. 15 is a presser roll and it is mounted for rotation about a fixed axis and its periphery is disclosed in confronting relation to the space between the squeeze rolls. As shown the presser roll is mounted on the driven shaft 5 which is journaled in fixed bearings 16.

It may be remarked that the squeeze and presser rolls are shown as provided with tires. 17, Fig. 3, are a series of carrying wheels and they are arranged in a horizontal row and spaced from the periphery of the presser roll. As shown they are mounted in a frame 18 arranged to be moved toward and away from the rim of the presser roll by means of eccentrics 19a arranged on a shaft 19 which can be turned by gearing 20. 21 are a series of spaced carriages adapted to travel on the carrying wheels 17 and provided with projecting blades 22. The blades enter the space between the squeeze rolls and they clear the periphery of the presser roll 15. The described adjustment of the carrying wheels 17 permits of the adjustment of the blades 22 in respect to the presser roll 15. The carriages 21 are connected with an endless belt or chain 23 which may pass around a pulley or drum 24 positioned at some little distance from the right hand end of the machine as shown in Fig. 3. Between the drum 24 and the machine the leaves or sheets are assembled in nested relation upon the blades 22 so that as the carriages progress toward the left the assemblages of nested sheets or leaves are carried in succession between the presser and squeeze rolls which operate to mould or shape the peaked back of the assemblages into flat backs which appear in the finished books. It is a characteristic of this operation that after the assemblage of sheets passes toward the left from between the rolls the inner sheets progressively lead the outer sheets producing a fanned effect. By reference to Fig. 11 this can be further explained by calling attention to the fact that the sheets at the left of the rolls 1 and 2 are in alignment as they are carried on the blade 22, and at the right the nested folded sheets have shifted their position after passing between the rolls so that they are no longer in alignment, and at the right in that figure the innermost sheets lead the outermost sheets and at the left there is produced a fish-tail formation. To correct this in cases where it occurs to an objectionable extent use is made of combing rolls 25, illustrated in Figs. 8 to 10 arranged in advance of the squeeze and presser rolls. This may be further described in connection with Fig. 12. At the left in that figure the folded nested sheets have been caused by the combing rolls 25, Figs. 8 and 9, to assume a position in which at the left the outside sheets lead the inside sheets so that there is formed what may be called a fish-tail arrangement. After the folded nested sheets have passed between the rolls 1 and 2 they are in alignment as shown at the right in said figure because the original fish-tail formation at the leading edge of the sheets has been corrected in their passage between the rolls 1 and 2. These rolls 25 have mounted for revolution around their own axes a series of small rolls 26 which bear upon the assemblage of sheets *a* as it passes between them. The combing wheels 25 are spring pressed toward each other as shown in Fig. 8 by means of springs 27, and they are positively driven thru gearing 28 and sprocket chains 29 from a shaft 30. The shaft 30 is geared to a driven wheel 31 by gearing 32, the driven wheel 31 is in contact with a driven disk 33 and it may be moved toward and away from the center of that disk by means of the screw connections 33a so as to increase or diminish the speed of rotation of the combing wheels 25. The purpose of the spring connections 27 is to permit books of different thicknesses to pass between the rolls.

34 is a guide shoe mounted for oscillation parallel to itself by means of links 35, and it is arranged in the path of the oncoming blades 22 and it is adapted to smooth the paper of an assembly of sheets constituting a book carried on the blade into the bite of the squeeze and pressure rolls. The positively driven cam 36 operates in one direction upon the end 37 of a lever 38 linked by an adjustable link 39 to the shoe 34. The lever 38 is also linked to a spring 40 which holds it up to the cam, the lever 38 is pivoted intermediate of its ends. The shoe 34, and its associated parts, are shown in Figs. 4 to 6, and the shoe smoothes the sheets and is provided at its entrance with fingers 42. It may be made in parts detachably connected by means 43 so that it can be renewed and interchanged with other shoes. By reference to Figs. 4 and 6, it will be observed that the fingers 42 are secured to the outside of the body of the shoe and are bent over the right hand end of the shoe and from that point are inclined outward. The groove in the shoe also tapers and conforms with the tapering space defined by the fingers 42 so that in Fig. 5 the flaring relation of the fingers is shown and between the fingers is indicated the tapering portion of the groove in the body of the shoe by means of shade lines. It may be remarked that in Fig. 1 the combing rolls are omitted and a grooved guide roll 44 in rear of the guide shoe is employed. When present it serves the purpose of holding the sheets or leaves in correct position. 45 indicates guide plates having flaring ends and their purpose is to properly position the leaves or sheets of the book *a* as it passes between the squeeze and presser rolls.

The mode of operation of the described machine may be explained as follows: The sheets are assembled on the blades 22 by means of suitable machinery which is located between the wheel 24 and the right hand end of the machine, Fig. 3, and which machinery need not be either illustrated nor described because it is or may be well understood gathering mechanism which assembles the sheets into a book form with a peaked back. Referring to Fig. 3 the blades carrying the peaked back assembly are fed from right to left by the chain 23. In their travel the pushers 46, carried by the blades, when present, insure or facilitate proper feed. As the carriages pass over the carrying wheels 17 the blades are fed past the combing rolls 25 which insure that the outer leaves or sheets of the assembly will be in advance of the inner sheets of the same. In the meanwhile, the guides 45 have properly positioned the assemblies of sheets or leaves. As the assembly of sheets or leaves is being drawn into and thru the space provided between the peripheries of the squeeze and presser rolls the reciprocating shoe 34 smooths the assemblage and keeps it in proper position on one of the blades 22. The effect of the passage of the assembly with its peaked back thru the space between the presser and squeeze rolls is to flatten the peaked back and square up the assembly in respect to it. It may be remarked that as the assembly of sheets or leaves passes away from the machine toward the left it can be subjected to the action of stapling or stitching mechanism which requires no further description or illustration because it forms no part of the present invention and at this general point in the travel of the books, covers and any other binding accessories that may be required can be applied.

Referring to Fig. 1 the grooved roll 44 when present serves to guide the assembly of leaves into the influence of the shoe 34.

Since books are not of uniform thickness and contain different numbers of leaves it is necessary to provide means for accurately and easily adjusting the machine to accommodate them. Such adjustments have been described and it may be remarked that they can conveniently be made from one side of the machine, for example, since the presser roll 15 is mounted on a shaft 5 that is fixed in space it is necessary to adjust the top edge of the blades 22 in respect to it to accommodate books of different thickness. For this purpose resort is had to the shaft 47, Fig. 2, thru which the gearing 20 operates to shift the eccentric mechanism by which the carrying wheels are raised or lowered. In the case of a relatively thick book or book containing a relatively large number of leaves they are lowered, similarly in the case of a book containing an increased number of leaves the squeeze rolls 1 and 2 require adjustment away from each other. This is accomplished, if necessary, by means of the worm shafts 14, Fig. 2, and this adjustment is permitted by the provision of the Oldham or like couplings above referred to. If adjustment of the speed of the combing rolls 25 is necessary it is accomplished by manipulation of the shaft 48, Fig. 8. The shoe 34 may be adjusted as required by means of the turnbuckle 39, Fig. 3.

It will be obvious to those skilled in the art to which the invention relates that modifications may be made in details of construction and arrangement without departing from the spirit of the invention which is not limited in respect to such matters or otherwise than as the prior art and the appended claims may require.

I claim:

1. A book making apparatus comprising a pair of positively driven spring pressed squeeze rolls arranged substantially at the same level with portions of their peripheries spaced opposite each other, a positively driven presser roll mounted for rotation in respect to a fixed axis and having its periphery in confronting relation to said space, a series of carrying wheels arranged in a row and spaced from the periphery of the presser roll, a series of blade elements mounted to travel on the carrying rolls and arranged to enter the space between the squeeze rolls and to clear the periphery of the presser roll, a spring pressed guide shoe mounted for oscillation parallel to itself and arranged in the path of the oncoming blade elements and adapted to smooth an assembly of sheets with a peaked back into the bite of the squeeze and presser rolls.

2. A book making machine comprising positively driven spring pressed squeeze rolls arranged substantially at the same level with portions of their peripheries spaced opposite each other, a positively driven presser roll mounted for rotation in respect to a fixed axis and having its periphery in confronting relation to said space, blades and means for advancing them in respect to the squeeze rolls, and means in respect to which the blades travel and which positions the blades in respect to the rolls.

3. A book making machine substantially as described in claim 2 and which is provided with a shoe arranged in advance of the rolls and means for moving the shoe in respect to the blades.

4. A machine substantially as described in claim 2 and which is provided with combing rolls in advance of the shoe.

5. A book making machine substantially as described in claim 2 provided with guide plates arranged on opposite sides of the blades and extending parallel with the direction of travel thereof.

6. A book making machine including squeeze rolls, a presser roll revoluble in respect to a fixed axis, means for driving the squeeze rolls, movable boxes for shifting the squeeze rolls, and self aligning couplings interposed between the boxes and the driving means.

7. A book making machine including squeeze rolls and a presser roll defining sides of a space between them, carriages provided with blades, means for moving the carriages, carrying wheels upon which the carriages travel under the control of said means past said rolls and said blades pass through said space, and eccentric means for adjusting the position of the carrying wheels and consequently the carriages and blades carried thereby in respect to the presser roll.

ALLEN L. GRAMMER.